(12) United States Patent
Kremer et al.

(10) Patent No.: US 11,067,149 B2
(45) Date of Patent: Jul. 20, 2021

(54) CENTRIFUGAL PENDULUM

(71) Applicant: Schaeffler Technologies AG & Co. KG, Herzogenaurach (DE)

(72) Inventors: Florent Kremer, Soufflenheim (FR); Alain Rusch, Gambsheim (FR); Evgenij Franz, Rastatt (DE); Jonas Schnell, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/048,655

(22) PCT Filed: Apr. 11, 2019

(86) PCT No.: PCT/DE2019/100334
§ 371 (c)(1),
(2) Date: Oct. 19, 2020

(87) PCT Pub. No.: WO2019/201388
PCT Pub. Date: Oct. 24, 2019

(65) Prior Publication Data
US 2021/0180664 A1    Jun. 17, 2021

(30) Foreign Application Priority Data
Apr. 20, 2018 (DE) .......................... 102018109558.9

(51) Int. Cl.
*F16F 15/14* (2006.01)
(52) U.S. Cl.
CPC ................ *F16F 15/145* (2013.01)

(58) Field of Classification Search
CPC .................................................... F16F 15/145
See application file for complete search history.

(56) References Cited

U.S. PATENT DOCUMENTS

2013/0139641 A1    6/2013   Schierling et al.
2015/0316125 A1*  11/2015   Maienschein ........... F16D 1/076
                                                            74/574.2

FOREIGN PATENT DOCUMENTS

| CN | 102762887 A | 10/2012 |
|---|---|---|
| CN | 102792059 A | 11/2012 |
| DE | 102006028552 A1 | 5/2007 |
| DE | 102009042812 A1 | 5/2010 |
| DE | 102009050353 A1 | 5/2010 |
| DE | 102010034812 A1 | 3/2011 |
| DE | 102010049553 A1 | 5/2011 |
| DE | 102011011918 A1 | 9/2011 |
| DE | 102011086532 A1 | 6/2012 |

(Continued)

*Primary Examiner* — Vicky A Johnson
(74) *Attorney, Agent, or Firm* — Kevin Parks

(57) ABSTRACT

A centrifugal pendulum includes a first flange, a first pendulum mass, and a first preloading element. The first pendulum mass is arranged on the first flange for movement in a radial direction relative to an axis of rotation and relative to the first flange. The first pendulum mass has an innermost point, an outermost point, a radial extension between the innermost point and the outermost point, and a first region arranged radially inward at most five percent (5%) of the radial extension from the outermost point. The first preloading element is arranged to contact the first pendulum mass in the first region for axially preloading the first pendulum mass with respect to the first flange.

10 Claims, 4 Drawing Sheets

(56) References Cited

FOREIGN PATENT DOCUMENTS

| | | |
|---|---|---|
| DE | 102012220560 A1 | 6/2013 |
| DE | 102013211391 A1 | 1/2014 |
| DE | 102013225622 A1 | 6/2015 |
| DE | 102014211711 A1 | 12/2015 |
| DE | 102014212771 A1 | 1/2016 |
| DE | 102014217304 A1 | 3/2016 |
| DE | 102014217459 A1 | 3/2016 |
| DE | 102014217460 A1 | 3/2016 |
| DE | 102015016635 A1 | 6/2016 |
| DE | 102016223192 A1 | 5/2017 |
| DE | 102017104968 B4 | 6/2020 |
| EP | 2607743 A1 | 6/2013 |
| JP | 2016118273 A2 | 6/2016 |
| WO | 15192846 A1 | 12/2015 |
| WO | 2015192845 A1 | 12/2015 |

\* cited by examiner

CENTRIFUGAL PENDULUM

CROSS-REFERENCE TO RELATED APPLICATIONS

This application is the United States National Phase of PCT Appln. No. PCT/DE2019/100334 filed Apr. 11, 2019, which claims priority to German Application No. DE102018109558.9 filed Apr. 20, 2018, the entire disclosures of which are incorporated by reference herein.

TECHNICAL FIELD

The present disclosure relates to a centrifugal pendulum, e.g., a centrifugal pendulum for a friction clutch. The friction clutch can be used in a drive train of a motor vehicle, for example. The centrifugal pendulum is intended, for example, to reduce engine-excited torsional oscillations. The centrifugal pendulum includes a flange (as a flywheel mass) and a plurality of pendulum masses which are arranged for movement on the flange.

BACKGROUND

A friction clutch generally includes a counter plate, a pressure plate that can be displaced in an axial direction with respect to the counter plate, and a clutch disk that can be arranged between the counter plate and the pressure plate. When the friction clutch is engaged, the clutch disk is frictionally connected to the counter plate and the pressure plate, so that a torque can be transferred, e.g., from an internal combustion engine via the counter plate and the pressure plate to the clutch disk, and from the clutch disk to a hub. When the friction clutch is disengaged, the frictional connection is released. The hub may be connected to a transmission input shaft in a rotationally fixed manner, for example.

A centrifugal pendulum is used, for example, in friction clutches to suppress the transfer of undesired oscillations, usually starting from the internal combustion engine to the driven system, at least within predetermined frequency ranges. In the field of centrifugal acceleration, the pendulum masses can perform oscillations along the raceways thereof if they are excited by torque fluctuations of an internal combustion engine. Energy is withdrawn from the excitation oscillation at appropriate times through these oscillations and fed back in so that the excitation oscillation is calmed with the centrifugal pendulum acting as a damper. Since both the natural frequency of the centrifugal pendulum oscillation and the excitation frequency are proportional to the speed, the damper effect of a centrifugal pendulum may be achieved over the entire frequency range.

At low speeds and the resulting high fluctuations in the transferred torques of the internal combustion engine, the pendulum Masses Can strike a boundary of the oscillation space. The function of a centrifugal pendulum is thus lost so that there is no longer any oscillation isolation.

From DE 10 2010 049 553 A1 a centrifugal pendulum is known in which an oscillation angle of the pendulum masses (in the circumferential direction) is reduced by friction. The pendulum masses are supported in the inner region of the pendulum masses against an axial direction.

It is also known from DE 10 2010 049 553 A1 that the pendulum masses are movably supported in relation to the flange via rollers (roller bodies). These rollers are designed to be arranged between a pendulum mass and the bearing surface (stop) of a flange of the centrifugal pendulum, so that the pendulum mass can perform a predefined damping movement as a result of an incoming oscillation. Thus, the pendulum mass rolls over the rolling section of the roller. The pendulum mass is movably fixed to the flange via the roller in such a way that it is secured in an axial direction and can oscillate in the plane normal to the oscillation axis along a predetermined curve. The oscillation axis is the axis of rotation of the friction clutch, so that the flange rotates around the axis of rotation of the friction clutch.

SUMMARY

A centrifugal pendulum includes a flange and a plurality of pendulum masses (e.g., two or more). The pendulum masses are arranged on the flange for movement at least in a radial direction with respect to an axis of rotation and with respect to the flange. The pendulum masses are preloaded in an axial direction with respect to the flange via a first preloading element. The pendulum masses have an extension in the radial direction between an innermost point (closest to the axis of rotation) and an outermost point (furthest away from the axis of rotation) of the pendulum masses. The first preloading element contacts the pendulum masses in a first region which is arranged in the radial direction at a distance of at most 5%, in particular at most 2%, e.g., at most 1% of the extension from the outermost point.

A centrifugal pendulum is used, for example, in friction clutches to suppress the transfer of undesirable oscillations, usually starting from an internal combustion engine to the driven system, at least within predetermined frequency ranges. In the field of centrifugal acceleration, the pendulum masses can perform oscillations along the raceways thereof if they are excited by torque fluctuations, e.g., of an internal combustion engine. Energy is withdrawn from the excitation vibration at appropriate times through these vibrations and fed back in so that the excitation vibration is calmed with the centrifugal pendulum acting as a damper.

A friction clutch may include a counter plate; a pressure plate that can be displaced in an axial direction with respect to the counter plate, and a clutch disk that can be arranged between the counter plate and the pressure plate. When the friction clutch is engaged, the clutch disk is frictionally connected to the counter plate and the pressure plate, so that a torque can be transferred, e.g., from an internal combustion engine via the counter plate and the pressure plate to the clutch disk and from the clutch disk to a hub. When the friction clutch is disengaged, the frictional connection is released. The hub is connected to a transmission input shaft in a rotationally fixed manner or forms the transmission input shaft, for example. The centrifugal pendulum can, e.g., be arranged on the hub or directly on the transmission input shaft.

It is proposed in the present case that the first preloading element contacts at least one of the pendulum masses as far outside as possible (in the radial direction). The pendulum masses can thus be effectively supported in relation to the axial direction.

The (first and/or second) preloading element serves on the one hand to support the pendulum mass in the axial direction. On the other hand, it serves to set a (predeterminable) frictional effect so that a displacement of the pendulum masses relative to the flange can be braked in the circumferential direction.

The flange may have an (annular) first outer circumferential line with a largest diameter, and the first preloading element contacts the pendulum mass in a first region which is arranged outside the largest diameter in the radial direction. This feature can also be implemented independently of the definition of the first region already described; accordingly, the first region is arranged in the radial direction at a distance of at most 5% of the extension from the outermost point.

In particular, the first region may be arranged outside the flange in the radial direction.

The first preloading element can be an annular preloading element that contacts all of the pendulum masses. In an example embodiment, the annular preloading element extends completely around the axis of rotation.

In an example embodiment, the (first or second) preloading element is connected to the pendulum mass and/or to the flange via a friction element (which is made of a plastic, for example). The friction element ensures predetermined sliding conditions (or coefficients of friction) so that a predetermined braking effect can be set with regard to the deflection of the pendulum masses in the circumferential direction.

In an example embodiment, the flange can have an outer circumferential line which runs in first angular regions along a circumferential direction between the pendulum masses and has a smaller first diameter in the radial direction. The outer circumferential line (also) runs in second angular regions in the circumferential direction and is (in this case) arranged adjacent to the pendulum masses and between the second angular regions and has a larger second diameter in the radial direction. The first preloading element contacts the pendulum mass in the second angular region and outside of the first diameter in the radial direction.

The outer circumferential line may extend in the circumferential direction to two different diameters. The transition between the diameters is, for example, continuous (the diameter changes starting, e.g., from the smaller diameter to the larger diameter, exclusively through enlargement or partially has a constant diameter—thus not comprising a reduction in the diameter).

In an example embodiment, the first preloading element contacts the flange outside the first diameter in the radial direction.

In an example embodiment, regions with a larger second diameter are thus provided on the flange so that the first preloading element for supporting the pendulum mass can be supported here.

The first preloading element may contact the pendulum mass further outward in the radial direction than the flange.

In an example embodiment, a second preloading element is arranged inside the first preloading element in the radial direction.

In an example embodiment, at least one pendulum mass can thus additionally be supported in an inner region against the axial direction.

At least the first preloading element (possibly also the second preloading element) can be a non-elastic spacer (i.e., not elastically deformable). However, the first and/or second preloading element may be designed to be elastically deformable (spring, corrugated washer, e.g., plate spring, leaf spring, etc.).

In an example embodiment, the centrifugal pendulum has a first flange and a second flange and the plurality of pendulum masses are arranged therebetween in an axial direction. Alternatively, a flange can be provided, wherein the majority of the pendulum masses are arranged on one side of the flange or on both sides of the flange.

In an example embodiment, a first and/or a second preloading element is arranged only between one of the first flange and the second flange and the pendulum masses.

A friction clutch is also proposed, including a counter plate, a pressure plate (which can be displaced in relation to the counter plate along the axial direction), a clutch disk arranged between the counter plate and the pressure plate, and the centrifugal pendulum described. The centrifugal pendulum may be connected (via a hub with a transmission input shaft and/or) to the clutch disk.

As a precaution, it should be noted that the numerals used here ("first", "second", etc.) serve primarily (only) to distinguish between several similar objects, sizes, or processes, and no necessary dependency and/or sequence of these objects, sizes, or processes to each other is purported. If a dependency and/or sequence is necessary, this is explicitly stated here or results in a manner obvious to the person skilled in the art when studying the specifically described configuration.

BRIEF DESCRIPTION OF THE DRAWINGS

Both the disclosure and the technical environment will be explained in more detail below with reference to the figures. The disclosure is not intended to be limited by the exemplary embodiments shown. For example, unless explicitly stated otherwise, it is also possible to extract partial aspects of the matter explained in the figures and to combine same with other components and findings from the present description and/or figures. The figures and the proportions shown are only schematic. The same reference numerals designate the same objects, so that explanations from other figures can be used as a supplement. In the figures.

DETAILED DESCRIPTION

Figure 1:
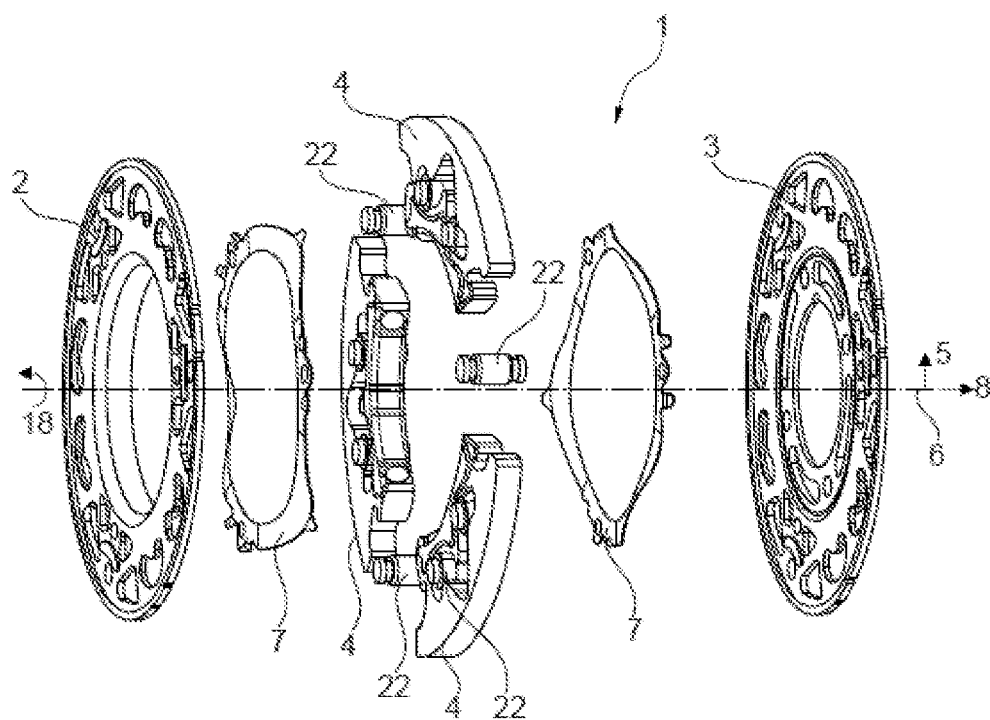
FIG. 1 shows an exploded view of a centrifugal pendulum in a perspective view.
Figure 2:
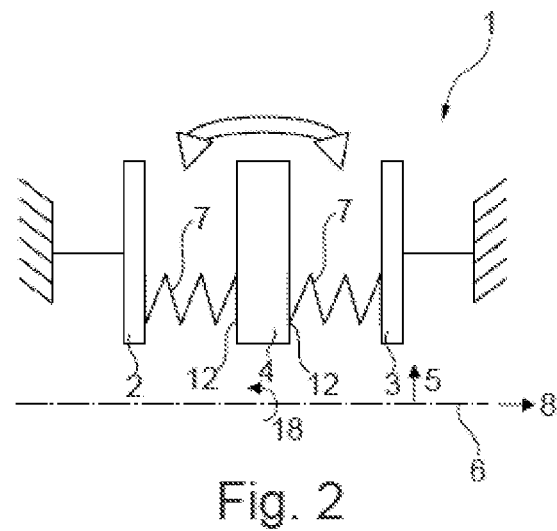
FIG. 2 shows a centrifugal pendulum in a side view.

FIG. 1 shows an exploded view of a centrifugal pendulum 1 in a perspective view. FIG. 2 shows a centrifugal pendulum 1 in a side view. FIGS. 1 and 2 are described together below.

The centrifugal pendulum 1 has a first flange 2, a second flange 3 and a plurality of (namely three) pendulum masses 4. The pendulum masses 4 are arranged on the flanges 2, 3 for movement in a radial direction 5 relative to the axis of rotation 6 and relative to the flanges 2, 3.

The pendulum masses 4 are movably supported With respect to the flanges 2, 3 via rollers 22. These rollers 22 are designed to be arranged between a pendulum mass 4 and the bearing surface of the flanges 2, 3 of the centrifugal pendulum 1, so that the pendulum mass 4 can perform a predefined damping movement as a result of an incoming oscillation. Thus, the pendulum mass 4 rolls over the rolling section of the roller 22. The pendulum mass 4 is movably fixed to the flanges 2, 3 via the roller 22 in such a way that it is secured in an axial direction 8 and can oscillate in the plane normal to the oscillation axis (axis of rotation 6) along a predetermined curve.

The centrifugal pendulum 1 further includes two first preloading elements 7, which enable the pendulum masses 4 to be supported with respect to the flanges 2, 3, The first preloading elements 7 serve, on the one hand, to support the pendulum masses 4 in the axial direction 8. On the other hand, they serve to set a (predeterminable) frictional effect so that a displacement of the pendulum masses 4 relative to the flanges 2, 3 can be braked in the circumferential direction 18.

FIG. 2 shows that the pendulum mass 4 is movably arranged with respect to the (fixed) flanges 2, 3. Thus, the pendulum mass 4 is preloaded in relation to the axial direction 8 via the first preloading elements 7 (shown here as springs). Tilting of the pendulum mass 4 is thus possible depending on the contacting of the preloading elements 7 on the pendulum mass 4. Here, the first preloading elements 7 contact the pendulum mass 4 in a first region 12 lying on the inside in the radial direction 5.

Figure 3:
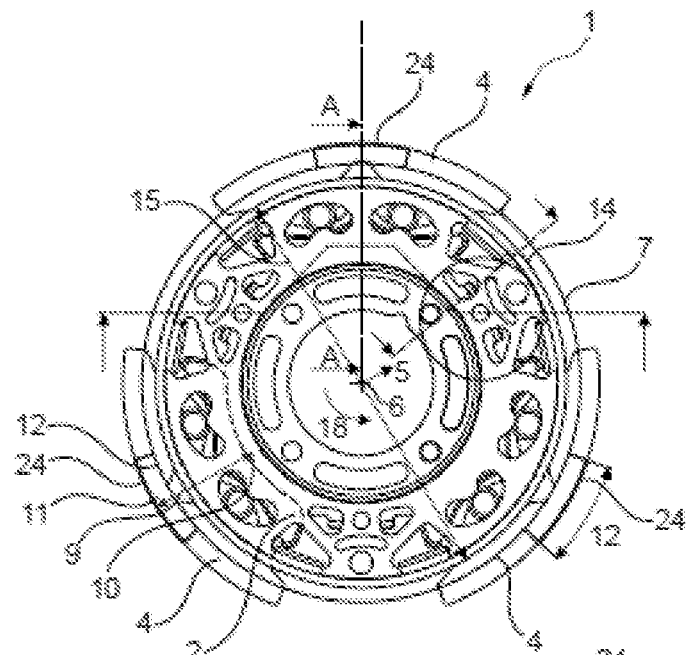
FIG. 3 shows a first embodiment variant of a centrifugal pendulum in a front view along the axis of rotation.
Figure 4:
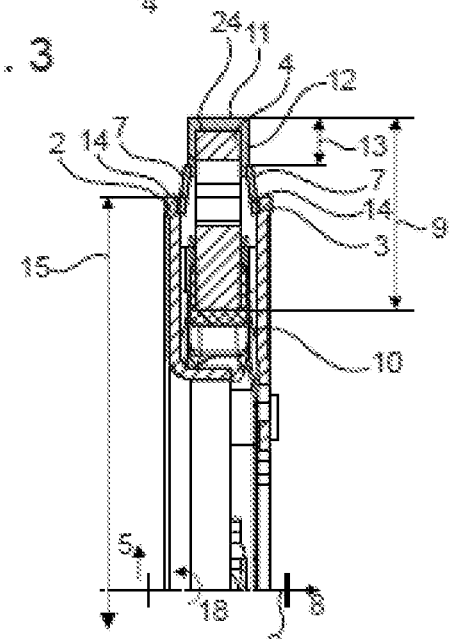
FIG. 4 shows the centrifugal pendulum according to FIG. 3 in a side view.

FIG. 3 shows a first embodiment variant of a centrifugal pendulum 1 in a front view along the axis of rotation 6. FIG. 4 shows the centrifugal pendulum 1 according to FIG. 3 in a side view. FIGS. 3 and 4 are described together below. Reference is made to the explanations relating to FIGS. 1 and 2.

In contrast to the illustration according to FIGS. 1 and 2, here are provided first preloading elements 7 which contact the pendulum masses far outward in the radial direction 5. The centrifugal pendulum 1 includes a first flange 2, a second flange 3 and a plurality of pendulum masses 4 (here three). The pendulum masses 4 are arranged on the flanges 2, 3 for movement at least in a radial direction 5 relative to an axis of rotation 6 and relative to the flanges 2, 3. The pendulum masses 4 are each preloaded via an annular first preloading element 7 in an axial direction 8 with respect to each flange 2, 3. The pendulum masses 4 have an extension 9 in the radial direction 5 between an innermost point 10 (closest to the axis of rotation 6) and an outermost point 11 (furthest away from the axis of rotation 6) of the pendulum masses 4. Each first preloading element 7 contacts the pendulum masses 4 in a first region 12, Which is arranged at a distance 13 from the outermost point 11 in the radial direction 5.

The flanges 2, 3 have an (annular) first outer circumferential line 14 with a largest diameter 15. The first preloading elements 7 contact the pendulum mass 4 in a first region 12 which is arranged outside the largest diameter 15 in the radial direction 5. The first region 12 is arranged outside the flanges 2, 3 in the radial direction 5.

The first preloading elements 7 are each annular preloading elements that contact all of the pendulum masses 4.

In the present case, the first preloading elements 7 are connected to the pendulum mass 4 via friction elements 24. The friction element 24 ensures predetermined sliding conditions (or coefficients of friction) so that a predetermined braking effect can be set with regard to the deflection of the pendulum masses 4 in the circumferential direction 18. The first preloading elements 7 contact the pendulum masses 4 in further outward the radial direction 5 than the respective flange 2, 3.

Figures 5, 6:
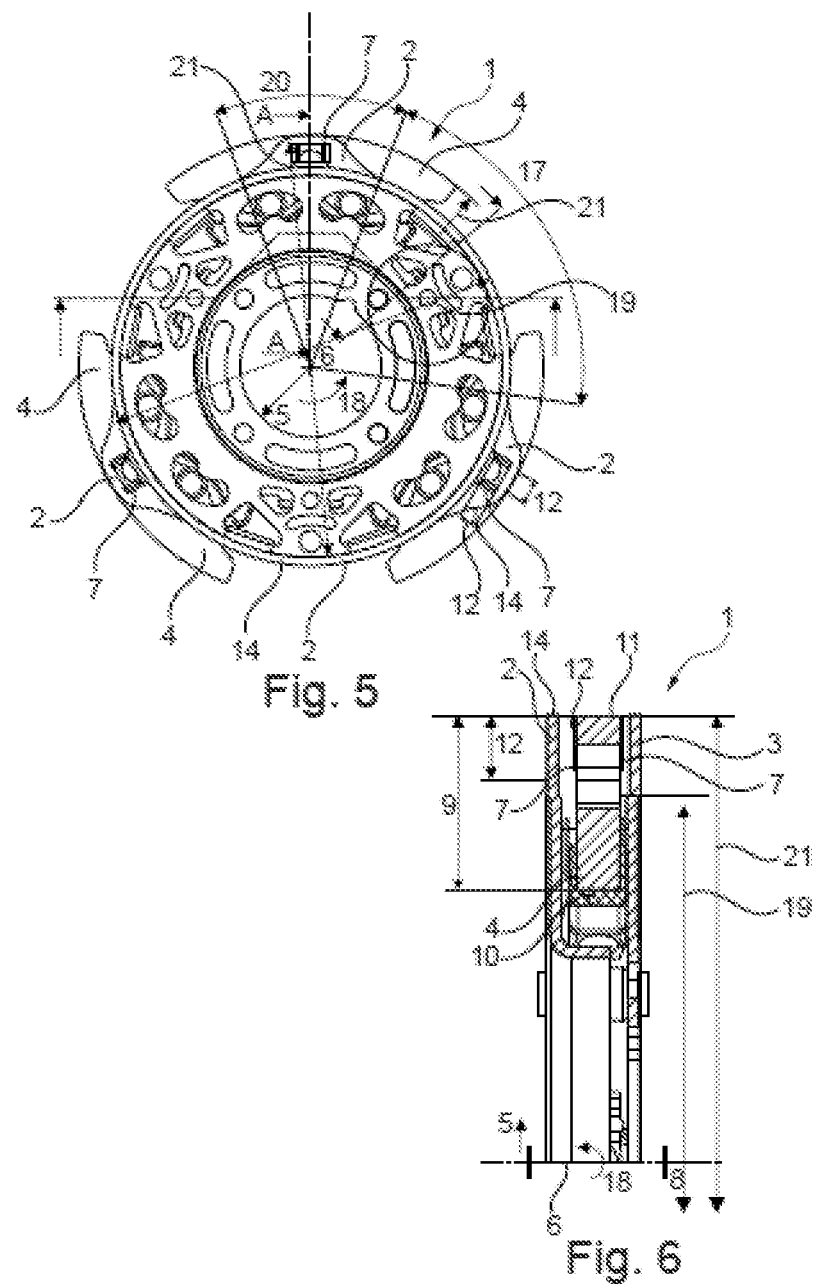
FIG. 5 shows a second embodiment variant of a centrifugal pendulum in a front view along the axis of rotation.
FIG. 6 shows the centrifugal pendulum according to FIG. 5 in a side view.

FIG. 5 shows a second embodiment variant of a centrifugal pendulum 1 in a front view along the axis of rotation 6. FIG. 6 shows the centrifugal pendulum 1 according to FIG. 5 in a side view. FIGS. 5 and 6 are described together below. Reference is made to the explanations relating to FIGS. 3 and 4.

In contrast to FIGS. 3 and 4, the flanges 2, 3 and the first preloading elements 7 are designed differently here. The flanges 2, 3 have an outer circumferential line 14, which runs in first angular regions 17 in a circumferential direction 18 between the pendulum masses 4 and has a smaller first diameter 19 (smaller first radius) in the radial direction 5. The outer circumferential line 14 also runs in second angular regions 20 in the circumferential direction 18 and is arranged adjacent to the pendulum masses 4 and between the second angular regions 20 and has a larger second diameter 21 (or larger second radius) in the radial direction 5. The first preloading elements 7 contact the pendulum mass 4 in the second angular region 20 and outside the first diameter 19 (first radius) in the first region 12 in the radial direction 5.

The outer circumferential line 14 extends in the circumferential direction 18 to two different diameters 19, 21. The transition between the diameters 19, 21 takes place continuously.

The first preloading elements 7 are designed here as springs which are fastened to the flange 2, 3 and from there extend toward the pendulum mass 4 in the axial direction 8. A first preloading element 7 is provided for each pendulum mass 4 and for each flange 2, 3. The first preloading elements 7 contact the flange 2, 3 outside the first diameter 19 in the radial direction 5.

Here, regions with a larger second diameter 21 are provided on the flange 2, 3, so that the first preloading elements 7 for supporting the pendulum mass 4 can be supported here.

Figure 7:
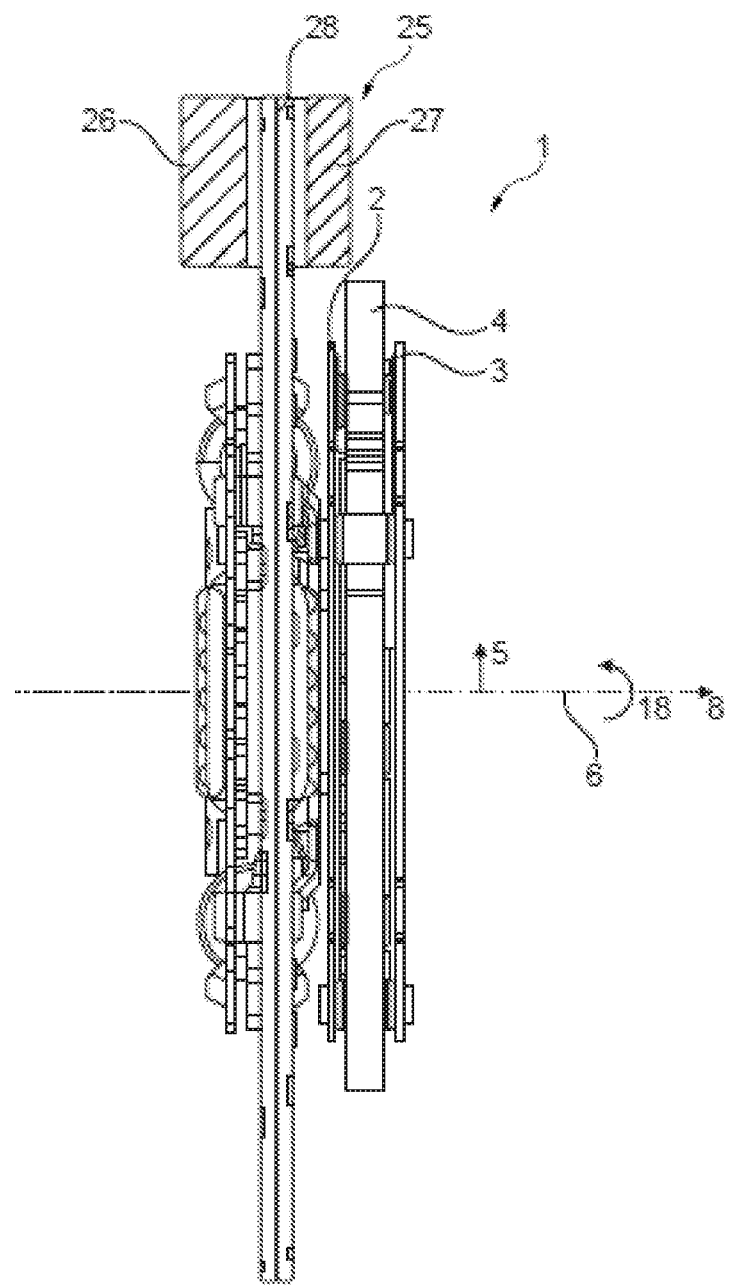
FIG. 7 shows a friction clutch with a centrifugal pendulum in a side view.

FIG. 7 shows a friction clutch 25 with a centrifugal pendulum 1 in a side view. The friction clutch 25 includes a counter plate 26, a pressure plate 27 which can be displaced with respect to the counter plate 26 in an axial direction 8, and a clutch disk 28 which can be arranged between the counter plate 26 and the pressure plate 27. When the friction clutch 25 is engaged, the clutch disk 28 is frictionally connected to the counter plate 26 and the pressure plate 27, so that a torque can be transferred, e.g., from an internal combustion engine via the counter plate 26 and the pressure plate 27 to the clutch disk 28 and from the clutch disk 28 to a hub. When the friction clutch 25 is disengaged, the frictional connection is released. The hub can, e.g., be rotatably connected to a transmission input shaft. The centrifugal pendulum 1 is connected to the transmission input shaft via a hub. The oscillations transferred to the clutch disk 28 can at least be reduced by the centrifugal pendulum 1.

REFERENCE NUMERALS

1 Centrifugal pendulum
2 First flange
3 Second flange
4 Pendulum mass
5 Radial direction
6 Axis of rotation
7 Preloading element
8 Axial direction
9 Extension
10 Innermost point
11 Outermost point
12 First region
13 Distance
14 Outer circumferential line
15 Largest diameter
16 Second region
17 First angular region
18 Circumferential direction
19 First diameter
20 Second angular region 21 Second diameter
22 Roller
24 Friction element
25 Friction clutch
26 Counter plate
27 Pressure plate
28 Clutch disk

The invention claimed is:

1. A centrifugal pendulum comprising:
a first flange;
a first pendulum mass:
  arranged on the first flange for movement in a radial direction relative to an axis of rotation and relative to the first flange; and
  comprising:
    an innermost point;
    an outermost point;
    a radial extension between the innermost point and the outermost point; and
    a first region arranged radially inward at most five percent (5%) of the radial extension from the outermost point; and
a first preloading element arranged to contact the first pendulum mass in the first region for axially preloading the first pendulum mass with respect to the first flange.

2. The centrifugal pendulum of claim 1, wherein:
the first flange comprises an outer circumferential line with first diameter; and
the first region is arranged radially outside of the first diameter.

3. The centrifugal pendulum of claim 1, further comprising a second pendulum mass, wherein the first preloading element is an annular preloading element that contacts the first pendulum mass and the second pendulum mass.

4. The centrifugal pendulum of claim 1, further comprising a second pendulum mass, wherein:
the first flange comprises:
  a first angular region arranged between the first pendulum mass and the second pendulum mass with a first diameter; and
  a second angular region arranged adjacent to the first pendulum mass with a second diameter, larger than the first diameter; and
the first preloading element contacts the first pendulum mass or the second pendulum mass in the second angular region, radially outside of the first angular region.

5. The centrifugal pendulum of claim 4, wherein the first preloading element contacts the first flange radially outside of the first diameter.

6. The centrifugal pendulum of claim 1, wherein the first preloading element contacts the first pendulum mass radially outside of the first flange.

7. The centrifugal pendulum of claim 1, further comprising a second preloading element arranged radially inside of the first preloading element.

8. The centrifugal pendulum of claim 1, wherein the first preloading element is a non-elastic spacer.

9. The centrifugal pendulum of claim 1, further comprising a second flange, wherein the first pendulum mass is arranged axially between the first flange and the second flange.

10. A friction clutch comprising:
a counter plate;
a pressure plate;
a clutch disk arranged between the counter plate and pressure plate; and
the centrifugal pendulum of claim 1.

* * * * *